(12) United States Patent
Langhammer

(10) Patent No.: US 9,684,488 B2
(45) Date of Patent: Jun. 20, 2017

(54) COMBINED ADDER AND PRE-ADDER FOR HIGH-RADIX MULTIPLIER CIRCUIT

(71) Applicant: Altera Corporation, San Jose, CA (US)

(72) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 190 days.

(21) Appl. No.: 14/669,288

(22) Filed: Mar. 26, 2015

(65) Prior Publication Data
US 2016/0283196 A1    Sep. 29, 2016

(51) Int. Cl.
*G06F 7/505* (2006.01)
*G06F 7/49* (2006.01)
*G06F 7/53* (2006.01)
*G06F 7/501* (2006.01)

(52) U.S. Cl.
CPC ............... *G06F 7/49* (2013.01); *G06F 7/501* (2013.01); *G06F 7/5312* (2013.01)

(58) Field of Classification Search
None
See application file for complete search history.

(56) References Cited

U.S. PATENT DOCUMENTS

| | | |
|---|---|---|
| 3,473,160 A | 10/1969 | Wahlstrom |
| 3,697,734 A | 10/1972 | Booth et al. |
| 3,800,130 A | 3/1974 | Martinson et al. |
| 4,156,927 A | 5/1979 | McElroy et al. |
| 4,179,746 A | 12/1979 | Tubbs |
| 4,212,076 A | 7/1980 | Conners |
| 4,215,406 A | 7/1980 | Gomola et al. |
| 4,215,407 A | 7/1980 | Gomola et al. |
| 4,422,155 A | 12/1983 | Amir et al. |

(Continued)

FOREIGN PATENT DOCUMENTS

| | | |
|---|---|---|
| EP | 0 158 430 | 10/1985 |
| EP | 0 326 415 | 8/1989 |

(Continued)

OTHER PUBLICATIONS

Altera, "DSP Blocks in Stratix III Devices," Chapter 5, pp. 1-42, Mar. 2010.

(Continued)

*Primary Examiner* — David H Malzahn

(57) ABSTRACT

Circuitry accepting a first input value and a second input value, and outputting (a) a first sum involving the first input value and the second input value, and (b) a second sum involving the first input value and the second input value, includes a first adder circuit, a second adder circuit, a compressor circuit and a preprocessing stage. The first input value and the second input value are input to the first adder circuit to provide the first sum. The first input value and the second input value are input to the preprocessing stage to provide inputs to the compressor circuit, which provides first and second compressed output signals which in turn are input to the second adder circuit to provide the second sum. The preprocessing stage may include circuitry to programmably zero the first input value, so that the first sum is programmably settable to the second input value.

21 Claims, 7 Drawing Sheets

(56) References Cited

U.S. PATENT DOCUMENTS

| | | |
|---|---|---|
| 4,484,259 A | 11/1984 | Palmer et al. |
| 4,521,907 A | 6/1985 | Amir et al. |
| 4,575,812 A | 3/1986 | Kloker et al. |
| 4,597,053 A | 6/1986 | Chamberlin |
| 4,616,330 A | 10/1986 | Betz |
| 4,623,961 A | 11/1986 | Mackiewicz |
| 4,682,302 A | 7/1987 | Williams |
| 4,718,057 A | 1/1988 | Venkitakrishnan et al. |
| 4,727,508 A | 2/1988 | Williams |
| 4,736,335 A | 4/1988 | Barban |
| 4,754,421 A | 6/1988 | Bosshart |
| 4,791,590 A | 12/1988 | Ku et al. |
| 4,799,004 A | 1/1989 | Mori |
| 4,823,260 A | 4/1989 | Imel et al. |
| 4,823,295 A | 4/1989 | Mader |
| 4,839,847 A | 6/1989 | Laprade |
| 4,871,930 A | 10/1989 | Wong et al. |
| 4,893,268 A | 1/1990 | Denman et al. |
| 4,908,788 A | 3/1990 | Fujiyama |
| 4,912,345 A | 3/1990 | Steele et al. |
| 4,918,637 A | 4/1990 | Morton |
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 4,999,803 A | 3/1991 | Turrini et al. |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,373,461 A | 12/1994 | Bearden et al. |
| 5,375,079 A | 12/1994 | Uramoto et al. |
| 5,381,357 A | 1/1995 | Wedgwood et al. |
| 5,404,324 A | 4/1995 | Colon-Benet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,631,848 A | 5/1997 | Laczko et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim et al. |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |

(56) References Cited

U.S. PATENT DOCUMENTS

| | | |
|---|---|---|
| 6,031,763 A | 2/2000 | Sansbury |
| 6,041,339 A | 3/2000 | Yu et al. |
| 6,041,340 A | 3/2000 | Mintzer |
| 6,052,327 A | 4/2000 | Reddy et al. |
| 6,052,755 A | 4/2000 | Terrill et al. |
| 6,052,773 A | 4/2000 | DeHon et al. |
| 6,055,555 A | 4/2000 | Boswell et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |
| 6,091,261 A | 7/2000 | DeLange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |
| 6,107,824 A | 8/2000 | Reddy et al. |
| 6,108,772 A | 8/2000 | Sharangpani |
| 6,130,554 A | 10/2000 | Kolze et al. |
| 6,140,839 A | 10/2000 | Kaviani et al. |
| 6,144,980 A | 11/2000 | Oberman |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,260,053 B1 | 7/2001 | Maulik et al. |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,327,605 B2 | 12/2001 | Arakawa et al. |
| 6,346,824 B1 | 2/2002 | New |
| 6,351,142 B1 | 2/2002 | Abbott |
| 6,353,843 B1 | 3/2002 | Chehrazi et al. |
| 6,359,468 B1 | 3/2002 | Park et al. |
| 6,360,240 B1 | 3/2002 | Takano et al. |
| 6,362,650 B1 | 3/2002 | New et al. |
| 6,366,944 B1 | 4/2002 | Hossain et al. |
| 6,367,003 B1 | 4/2002 | Davis |
| 6,369,610 B1 | 4/2002 | Cheung et al. |
| 6,377,970 B1 | 4/2002 | Abdallah et al. |
| 6,407,576 B1 | 6/2002 | Ngai et al. |
| 6,407,694 B1 | 6/2002 | Cox et al. |
| 6,427,157 B1 | 7/2002 | Webb |
| 6,434,587 B1 | 8/2002 | Liao et al. |
| 6,438,569 B1 | 8/2002 | Abbott |
| 6,438,570 B1 | 8/2002 | Miller |
| 6,446,107 B1 | 9/2002 | Knowles |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,487,575 B1 | 11/2002 | Oberman |
| 6,523,055 B1 | 2/2003 | Yu et al. |
| 6,523,057 B1 | 2/2003 | Savo et al. |
| 6,529,931 B1 * | 3/2003 | Besz .............. G06F 7/508 708/710 |
| 6,531,888 B2 | 3/2003 | Abbott |
| 6,538,470 B1 | 3/2003 | Langhammer et al. |
| 6,539,413 B1 * | 3/2003 | Goldovsky .......... G06F 7/506 708/700 |
| 6,542,000 B1 | 4/2003 | Black et al. |
| 6,556,044 B2 | 4/2003 | Langhammer et al. |
| 6,557,092 B1 | 4/2003 | Callen |
| 6,571,268 B1 | 5/2003 | Giacalone et al. |
| 6,573,749 B2 | 6/2003 | New et al. |
| 6,574,762 B1 | 6/2003 | Karimi et al. |
| 6,578,060 B2 | 6/2003 | Chen et al. |
| 6,591,283 B1 | 7/2003 | Conway et al. |
| 6,591,357 B2 | 7/2003 | Mirsky |
| 6,600,495 B1 | 7/2003 | Boland et al. |
| 6,600,788 B1 | 7/2003 | Dick et al. |
| 6,628,140 B2 | 9/2003 | Langhammer et al. |
| 6,687,722 B1 | 2/2004 | Larsson et al. |
| 6,692,534 B1 | 2/2004 | Wang et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,732,134 B1 | 5/2004 | Rosenberg |
| 6,744,278 B1 | 6/2004 | Liu et al. |
| 6,745,254 B2 | 6/2004 | Boggs et al. |
| 6,763,367 B2 | 7/2004 | Kwon et al. |
| 6,771,094 B1 | 8/2004 | Langhammer et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,801,924 B1 | 10/2004 | Green et al. |
| 6,836,839 B2 | 12/2004 | Master et al. |
| 6,874,079 B2 | 3/2005 | Hogenauer |
| 6,889,238 B2 | 5/2005 | Johnson |
| 6,904,471 B2 | 6/2005 | Boggs et al. |
| 6,915,322 B2 | 7/2005 | Hong |
| 6,924,663 B2 | 8/2005 | Masui et al. |
| 6,963,890 B2 | 11/2005 | Dutta et al. |
| 6,971,083 B1 | 11/2005 | Farrugia et al. |
| 6,978,287 B1 | 12/2005 | Langhammer |
| 6,983,300 B2 | 1/2006 | Ferroussat |
| 7,020,673 B2 | 3/2006 | Ozawa |
| 7,024,446 B2 | 4/2006 | Langhammer et al. |
| 7,047,272 B2 | 5/2006 | Giacalone et al. |
| 7,062,526 B1 | 6/2006 | Hoyle |
| 7,093,204 B2 | 8/2006 | Oktem et al. |
| 7,107,305 B2 | 9/2006 | Deng et al. |
| 7,113,969 B1 | 9/2006 | Green et al. |
| 7,181,484 B2 | 2/2007 | Stribaek et al. |
| 7,230,451 B1 | 6/2007 | Langhammer |
| 7,313,585 B2 | 12/2007 | Winterrowd |
| 7,343,388 B1 | 3/2008 | Burney et al. |
| 7,395,298 B2 | 7/2008 | Debes et al. |
| 7,401,109 B2 | 7/2008 | Koc et al. |
| 7,409,417 B2 | 8/2008 | Lou |
| 7,415,542 B2 | 8/2008 | Hennedy et al. |
| 7,421,465 B1 | 9/2008 | Rarick et al. |
| 7,428,565 B2 | 9/2008 | Fujimori |
| 7,428,566 B2 | 9/2008 | Siu et al. |
| 7,430,578 B2 | 9/2008 | Debes et al. |
| 7,430,656 B2 | 9/2008 | Sperber et al. |
| 7,447,310 B2 | 11/2008 | Koc et al. |
| 7,472,155 B2 | 12/2008 | Simkins et al. |
| 7,508,936 B2 | 3/2009 | Eberle et al. |
| 7,536,430 B2 | 5/2009 | Guevokian et al. |
| 7,567,997 B2 | 7/2009 | Simkins et al. |
| 7,590,676 B1 | 9/2009 | Langhammer |
| 7,646,430 B2 | 1/2010 | Brown Elliott et al. |
| 7,650,374 B1 | 1/2010 | Gura et al. |
| 7,668,896 B2 | 2/2010 | Lutz et al. |
| 7,719,446 B2 | 5/2010 | Rosenthal et al. |
| 7,720,898 B2 | 5/2010 | Driker et al. |
| 7,769,797 B2 | 8/2010 | Cho et al. |
| 7,814,136 B1 | 10/2010 | Verma et al. |
| 7,814,137 B1 | 10/2010 | Mauer |
| 7,822,799 B1 | 10/2010 | Langhammer et al. |
| 7,836,117 B1 | 11/2010 | Langhammer et al. |
| 7,865,541 B1 | 1/2011 | Langhammer |
| 7,917,567 B1 | 3/2011 | Mason et al. |
| 7,930,335 B2 | 4/2011 | Gura |

(56) References Cited

U.S. PATENT DOCUMENTS

| | | |
|---|---|---|
| 7,930,336 B2 | 4/2011 | Langhammer |
| 8,024,394 B2 | 9/2011 | Prokopenko |
| 8,090,758 B1 | 1/2012 | Shimanek et al. |
| 8,112,466 B2 | 2/2012 | Minz et al. |
| 8,412,756 B1 | 4/2013 | Langhammer |
| 8,447,800 B2 | 5/2013 | Dockser et al. |
| 8,468,192 B1 | 6/2013 | Langhammer |
| 8,484,265 B1 | 7/2013 | Langhammer |
| 8,510,354 B1 | 8/2013 | Langhammer |
| 8,539,016 B1 | 9/2013 | Langhammer et al. |
| 8,543,634 B1 | 9/2013 | Xu et al. |
| 8,577,951 B1 | 11/2013 | Langhammer |
| 8,620,980 B1 | 12/2013 | Mauer et al. |
| 8,645,449 B1 | 2/2014 | Langhammer et al. |
| 8,645,450 B1 | 2/2014 | Choe et al. |
| 8,645,451 B2 | 2/2014 | Langhammer |
| 8,650,231 B1 | 2/2014 | Langhammer |
| 8,650,236 B1 | 2/2014 | Choe |
| 8,706,790 B1 | 4/2014 | Langhammer |
| 8,751,551 B2 | 6/2014 | Streicher et al. |
| 8,762,443 B1 | 6/2014 | Kurtz |
| 8,812,576 B1 | 8/2014 | Mauer |
| 8,949,298 B1 | 2/2015 | Langhammer |
| 8,959,137 B1 | 2/2015 | Langhammer |
| 2001/0023425 A1 | 9/2001 | Oberman et al. |
| 2001/0029515 A1 | 10/2001 | Mirsky |
| 2001/0037352 A1 | 11/2001 | Hong |
| 2002/0002573 A1 | 1/2002 | Landers et al. |
| 2002/0032713 A1 | 3/2002 | Jou et al. |
| 2002/0038324 A1 | 3/2002 | Page et al. |
| 2002/0049798 A1 | 4/2002 | Wang et al. |
| 2002/0078114 A1 | 6/2002 | Wang et al. |
| 2002/0089348 A1 | 7/2002 | Langhammer |
| 2002/0116434 A1 | 8/2002 | Nancekievill |
| 2002/0143841 A1 | 10/2002 | Farooqui et al. |
| 2002/0174158 A1* | 11/2002 | Sutherland ............. G06F 7/508 708/710 |
| 2003/0065699 A1 | 4/2003 | Burns |
| 2003/0088757 A1 | 5/2003 | Lindner et al. |
| 2004/0064770 A1 | 4/2004 | Xin |
| 2004/0083412 A1 | 4/2004 | Corbin et al. |
| 2004/0103133 A1 | 5/2004 | Gurney |
| 2004/0122882 A1 | 6/2004 | Zakharov et al. |
| 2004/0148321 A1 | 7/2004 | Guevorkian et al. |
| 2004/0172439 A1 | 9/2004 | Lin |
| 2004/0178818 A1 | 9/2004 | Crotty et al. |
| 2004/0193981 A1 | 9/2004 | Clark et al. |
| 2004/0267857 A1 | 12/2004 | Abel et al. |
| 2004/0267863 A1 | 12/2004 | Bhushan et al. |
| 2005/0038842 A1 | 2/2005 | Stoye |
| 2005/0144212 A1 | 6/2005 | Simkins et al. |
| 2005/0144215 A1 | 6/2005 | Simkins et al. |
| 2005/0144216 A1 | 6/2005 | Simkins et al. |
| 2005/0166038 A1 | 7/2005 | Wang et al. |
| 2005/0187997 A1 | 8/2005 | Zheng et al. |
| 2005/0187999 A1 | 8/2005 | Zheng et al. |
| 2005/0262175 A1 | 11/2005 | Iino et al. |
| 2006/0020655 A1 | 1/2006 | Lin |
| 2006/0112160 A1 | 5/2006 | Ishii et al. |
| 2007/0083585 A1 | 4/2007 | St Denis et al. |
| 2007/0185951 A1 | 8/2007 | Lee et al. |
| 2007/0185952 A1 | 8/2007 | Langhammer et al. |
| 2007/0241773 A1 | 10/2007 | Hutchings et al. |
| 2008/0133627 A1 | 6/2008 | Langhammer et al. |
| 2008/0159441 A1 | 7/2008 | Liao et al. |
| 2008/0183783 A1 | 7/2008 | Tubbs |
| 2009/0083358 A1 | 3/2009 | Allen |
| 2009/0113186 A1 | 4/2009 | Kato et al. |
| 2009/0172052 A1 | 7/2009 | DeLaquil et al. |
| 2009/0182795 A1 | 7/2009 | Dobbek et al. |
| 2009/0187615 A1 | 7/2009 | Abe et al. |
| 2009/0228689 A1 | 9/2009 | Muff et al. |
| 2009/0292750 A1 | 11/2009 | Reyzin et al. |
| 2009/0300088 A1 | 12/2009 | Michaels et al. |
| 2009/0300323 A1 | 12/2009 | Hessel et al. |
| 2010/0098189 A1 | 4/2010 | Oketani |
| 2010/0146022 A1 | 6/2010 | Swartzlander et al. |
| 2010/0191939 A1 | 7/2010 | Muff et al. |
| 2011/0106868 A1 | 5/2011 | Lutz |
| 2011/0137970 A1 | 6/2011 | Dockser et al. |
| 2011/0264719 A1* | 10/2011 | Mortensen ............. G06F 7/4824 708/204 |
| 2012/0166512 A1 | 6/2012 | Wong et al. |
| 2013/0138711 A1 | 5/2013 | Sugisawa |
| 2014/0067895 A1 | 3/2014 | Wang |
| 2014/0089371 A1 | 3/2014 | De Dinechin et al. |
| 2016/0079960 A1* | 3/2016 | Berscheid .......... H03H 17/0275 708/306 |
| 2016/0283196 A1* | 9/2016 | Langhammer ............ G06F 7/49 |

FOREIGN PATENT DOCUMENTS

| | | |
|---|---|---|
| EP | 0 380 456 | 8/1990 |
| EP | 0 411 491 | 2/1991 |
| EP | 0 419 105 | 3/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 049 025 | 11/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95/27243 | 10/1995 |
| WO | WO96/28774 | 9/1996 |
| WO | WO97/08606 | 3/1997 |
| WO | WO98/12629 | 3/1998 |
| WO | WO98/32071 | 7/1998 |
| WO | WO98/38741 | 9/1998 |
| WO | WO99/22292 | 5/1999 |
| WO | WO99/31574 | 6/1999 |
| WO | WO99/56394 | 11/1999 |
| WO | WO00/51239 | 8/2000 |
| WO | WO00/52824 | 9/2000 |
| WO | WO01/13562 | 2/2001 |
| WO | WO 2005/066832 | 7/2005 |
| WO | WO 2005/101190 | 10/2005 |
| WO | WO 2010/102007 | 9/2010 |

OTHER PUBLICATIONS

Altera Corporation, "Statix II Device Handbook, Chapter 6—DSP Blocks in Stratix II Devices," v1.1, Jul. 2004.

Altera Corporation, "Digital Signal Processing (DSP)," *Stratix Device Handbook*, vol. 2, Chapter 6 and Chapter 7, v1.1 (Sep. 2004).

Altera Corporation, "DSP Blocks in Stratix II and Stratix II GX Devices," *Stratix II Device Handbook*, vol. 2, Chapter 6, v4.0 (Oct. 2005).

Altera Corporation, "FIR Compiler: MegaCore® Function User Guide," version 3.3.0, rev. 1, pp. 3-11 through 3-15 (Oct. 2005).

(56) References Cited

OTHER PUBLICATIONS

Altera Corporation, "Advanced Synthesis Cookbook: A Design Guide for Stratix II, Stratix III and Stratix IV Devices," Document Version 3.0, 112 pgs., May 2008.
Amos, D., "PLD architectures match DSP algorithms," *Electronic Product Design*, vol. 17, No. 7, Jul. 1996, pp. 30, 32.
Analog Devices, Inc., The Applications Engineering Staff of Analog Devices, DSP Division, *Digital Signal Processing Applications Using the ADSP-2100 Family* (edited by Amy Mar), 1990, pp. 141-192).
Andrejas, J., et al., "Reusable DSP functions in FPGAs," *Field-Programmable Logic and Applications. Roadmap to Reconfigurable Computing. 10th International Conference, FPL 2000. Proceedings (Lecture Notes in Computer Science vol. 1896)*, Aug. 27-30, 2000, pp. 456-461.
Aoki, T., "Signed-weight arithmetic and its application to a field-programmable digital filter architecture," *IEICE Transactions on Electronics*, 1999, vol. E82C, No. 9, Sep. 1999, pp. 1687-1698.
Ashour, M.A., et al., "An FPGA implementation guide for some different types of serial-parallel multiplier-structures," *Microelectronics Journal*, vol. 31, No. 3, 2000, pp. 161-168.
Berg, B.L., et al. "Designing Power and Area Efficient Multistage FIR Decimators with Economical Low Order Filters," *ChipCenter Technical Note*, Dec. 2001.
Bursky, D., "Programmable Logic Challenges Traditional ASIC SoC Designs", *Electronic Design*, Apr. 15, 2002.
Chhabra, A. et al., Texas Instruments Inc., "A Block Floating Point Implementation on the TMS320C54x DSP", Application Report SPRA610, Dec. 1999, pp. 1-10.
Colet, P., "When DSPs and FPGAs meet: Optimizing image processing architectures," *Advanced Imaging*, vol. 12, No. 9, Sep. 1997, pp. 14, 16, 18.
Crookes, D., et al., "Design and implementation of a high level programming environment for FPGA-based image processing," *IEE Proceedings-Vision, Image and Signal Processing*, vol. 147, No. 4, Aug. 2000, pp. 377-384.
Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.
deDinechin, F. et al., "Large multipliers with less DSP blocks," retrieved from http://hal-ens-lyon.archives-ouvertes.fr/ensl-00356421/en/, 9 pgs., available online Jan. 2009.
de Dinechin F.,et al., "FPGA-Specific Custom Arithmetic Datapath Design: LIP Research Report RR2010-34," Dec. 2010, 8 pages.
Dick, C., et al., "Configurable logic for digital communications: some signal processing perspectives," *IEEE Communications Magazine*, vol. 37, No. 8, Aug. 1999, pp. 107-111.
Do, T.-T., et al., "A flexible implementation of high-performance FIR filters on Xilinx FPGAs," *Field-Programmable Logic and Applications: From FPGAs to Computing Paradigm. 8th International Workshop, FPL'98. Proceedings*, Hartenstein, R.W., et al., eds., Aug. 31-Sep. 3, 1998, pp. 441-445.
Farooqui, A., et al., "General Data-Path Organization of a MAC unit for VLSI Implementation of DSP Processors," ISCAS '98, Part 2, May 31, 1998-Jun. 3, 1998, pp. 260-263.
Fujioka, Y., et al., "240 MOPS Reconfigurable Parallel VLSI Processor for Robot Control", Proceedings of the 1992 International Conference on Industrial Electronics, Control, Instrumentation, and Automation, vol. 3, pp. 1385-1390, Nov. 9-13, 1992.
Gaffer, A.A., et al., "Floating-Point Bitwidth Analysis via Automatic Differentiation," *IEEE Conference on Field Programmable Technology*, Hong Kong, Dec. 2002.
Govindu, G. et al., "A Library of Parameterizable Floating-Point Cores for FPGAs and Their Application to Scientific Computing," *Proc Int'l Conf. Eng. Reconfigurable Systems and Algorithms (ERSA'05)*, Jun. 2005.

Govindu, G. et al., "Analysis of High-performance Floating-point Arithmetic on FPGAs," *Proceedings of the 18th International Parallel and Distributed Processing Symposium (PDPS'04)* pp. 149-156, Apr. 2004.
Guccione, S.A.,"Run-time Reconfiguration at Xilinx," *Parallel and distributed processing: 15 IPDPS 2000 workshops*, Rolim, J., ed., May 1-5, 2000, p. 873.
Hauck, S., "The Future of Reconfigurable Systems," *Keynote Address, 5th Canadian Conference on Field Programmable Devices*, Jun. 1998, http:--www.ee.washington.edu-people-faculty-hauck-publications-ReconfigFuture.PDF.
Haynes, S.D., et al., "Configurable multiplier blocks for embedding in FPGAs," *Electronicas Letters*, vol. 34, No. 7, pp. 638-639 (Apr. 2, 1998).
Heysters, P.M., et al., "Mapping of DSP algorithms on field programmable function arrays," *Field-Programmable Logic and Applications. Roadmap to Reconfigurable Computing. 10th International Conference, FPL 2000. Proceedings (Lecture Notes in Computer Science vol. 1896)*, Aug. 27-30, 2000, pp. 400-411.
Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.
IEEE Standard for Binary Floating-Point Arithmetic, *ANSI/IEEE Standard, Std 754*, 1985, pp. 1-14.
IEEE Standard for Floating-Point Arithmetic, *IEEE Std 754*, 2008, pp. 1-58.
"Implementing Multipliers in FLEX 10K EABs", Altera, Mar. 1996.
"Implementing Logic with the Embedded Array in FLEX 10K Devices", Altera, May 2001, ver. 2.1.
Jinghua Li, "Design a pocket multi-bit multiplier in FPGA," *1996 2nd International Conference on ASIC Proceedings* IEEE Cat. No. 96TH8140), Oct. 21-24, 1996, pp. 275-279.
Jones, G., "Field-programmable digital signal conditioning," *Electronic Product Design*, vol. 21, No. 6, Jun. 2000, pp. C36-C38.
Karlstrom, K., et al., "High Performance, Low Latency FPGA based Floating Point Adder and Multiplier Units in a Virtex 4," Norchip Conf., pp. 31-34, 2006.
Kiefer, R., et al., "Performance comparison of software-FPGA hardware partitions for a DSP application," *14th Australian Microelectronics Conference. Microelectronics: Technology Today for the Future. MICRO '97 Proceedings*, Sep. 28-Oct. 1, 1997, pp. 88-93.
Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.
Kramberger, I., "DSP acceleration using a reconfigurable FPGA," *ISIE '99. Proceedings of the IEEE International Symposium on Industrial Electronics* (Cat. No. 99TH8465), vol. 3, Jul. 12-16, 1999, pp. 1522-1525.
Langhammer, M., "How to implement DSP in programmable logic," *Elettronica Oggi*, No. 266, Dec. 1998, pp. 113-115.
Langhammer, "Floating Point Datapath Synthesis for FPGAs," *IEEE International Conference on Field Programmable Logic and Applications, 2008* (FPL 2008), pp. 355-360 (Sep. 8-10, 2008).
Langhammer, M., "Implementing a DSP in Programmable Logic," *Online EE Times*, May 1998, http:--www.eetimes.com-editorial-1998-coverstory9805.html.
Lazaravich, B.V., "Function block oriented field programmable logic arrays," *Motorola, Inc. Technical Developments*, vol. 18, Mar. 1993, pp. 10-11.
Lattice Semiconductor Corp, *ORCA® FPGA Express™ Interface Manual: ispLEVER® Version 3.0*, 2002.
Lucent Technologies, Microelectronics Group,"Implementing and Optimizing Multipliers in ORCA™ FPGAs,", Application Note. AP97-008FGPA, Feb. 1997.
Lund, D., et al., "A new development system for reconfigurable digital signal processing," First International Conference on 3G Mobile Communication Technologies (Conf. Publ. No. 471), Mar. 27-29, 2000, pp. 306-310.

(56) References Cited

OTHER PUBLICATIONS

Martinson, L. et al., "Digital matched Filtering with Pipelined Floating Point Fast Fourier Transforms (FFT's)" *IEEE Transactions on Acoustics, Speech, and Signal Processing*, vol. ASSP-23, No. 2, pp. 222-234, Apr. 1975.

Miller, N.L., et al., "Reconfigurable integrated circuit for high performance computer arithmetic," *Proceedings of the 1998 IEE Colloquium on Evolvable Hardware Systems (Digest)*, No. 233, 1998, pp. 2-1-2-4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nakasato, N., et al., "Acceleration of Hydrosynamical Simulations using a FPGA board" *The Institute of Electronics Information and Communication Technical Report CPSY2005-47*, vol. 105, No. 515, Jan. 17, 2006.

Nedjah, N., et al., "Fast Less Recursive Hardware for Large Number Multiplication Using Karatsuba-Ofman's Algorithm," *Computer and Information Sciences—ISCIS*, pp. 43-50, 2003.

Nozal, L., et al., "A new vision system: programmable logic devices and digital signal processor architecture (PLD+DSP)," *Proceedings IECON '91. 1991 International Conference on Industrial Electronics, Control and Instrumentation* (Cat. No. 91CH2976-9), vol. 3, Oct. 28-Nov. 1, 1991, pp. 2014-2018.

Osana, Y., et al., "Hardware-resource Utilization Analysis on an FPGA-Based Biochemical Simulator ReCSiP", *The Institute of Electronics Information and Communication Technical Report CPSY2005-63*, vol. 105, No. 516, Jan. 18, 2006.

Papenfuss, J.R, et al., "Implementation of a real-time, frequency selective, RF channel simulator using a hybrid DSP-FPGA architecture," *RAWCON 2000: 2000 IEEE Radio and Wireless Conference* (Cat. No. 00EX404), Sep. 10-13, 2000, pp. 135-138.

Parhami, B., "Configurable arithmetic arrays with data-driven control," *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheet", *Quicklogic*, Aug. 7, 2001, revision B.

Rangasayee, K., "Complex PLDs let you produce efficient arithmetic designs," *EDN (European Edition)*, vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (Cat. No. 99EX303), Jul. 26-28, 1999, pp. 147-150.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Thapliyal, H., et al., "Combined Integer and Floating Point Multiplication Architecture (CIFM) for FPGSs and Its Reversible Logic Implementation", *Proceedings MWSCAS 2006*, Puerto Rico, 5 pages, Aug. 2006.

Thapliyal, H., et al., "Combined Integer and Variable Precision (CIVP) Floating Point Multiplication Architecture for FPGAs", *Proceedings of the 2007 International Conference on Parallel and Distributed Processing Techniques and Applications (PDPTA'07)* Las Vegas, US, vol. 1, pp. 449-450, Jun. 2007.

Tisserand, A., et al., "An on-line arithmetic based FPGA for low power custom computing," *Field Programmable Logic and Applications, 9th International Workshop, FPL'99, Proceedings (Lecture Notes in Computer Science* vol. 1673), Lysaght, P., et al., eds., Aug. 30-Sep. 1, 1999, pp. 264-273.

Tralka, C., "Symbiosis of DSP and PLD," *Elektronik*, vol. 49, No. 14, Jul. 11, 2000, pp. 84-96.

Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.

Valls, J., et al., "A Study About FPGA-Based Digital Filters," *Signal Processing Systems, 1998*, SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1 of 4.

"Virtex-II 1.5V Field-Programmable Gate Arrays", *Xilinx*, Apr. 2, 2001, module 2 of 4.

Vladimirova, T. et al., "Floating-Point Mathematical Co-Processor for a Single-Chip On-Board Computer," *MAPLD'03 Conference, D5*, Sep. 2003.

Wajih, E.-H.Y. et al., "Efficient Hardware Architecture of Recursive Karatsuba-Ofman Multiplier," *3rd International Conference on Design and Technology of Integrated Systems in Nanoscale Era*, 6 pgs, Mar. 2008.

Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication," *MathWorld—A Wolfram Web Resource* (Dec. 9, 2007), accessed Dec. 11, 2007 at http:--mathworld.wolfram.com-KaratsubaMultiplication.html.

Wenzel, L., "Field programmable gate arrays (FPGAs) to replace digital signal processor integrated circuits," *Elektronik*, vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http:--www.iro.umontreal.ca--aboulham-F6221-Xilinx%20A%201D%20systolic%20FIR.htm.

Xilinx, Inc., "The Future of FPGA's," White Paper, available Nov. 14, 2005 for download from http:--www.xilinx.com-prs_ rls,5yrwhite.htm.

Xilinx Inc., "XtremeDSP Design Considerations User Guide," v 1.2, Feb. 4, 2005.

Xilinx Inc., "Complex Multiplier v2.0", DS291 Product Specification/Datasheet, Nov. 2004.

Xilinx, Inc., "Virtex-5 ExtremeDSP Design Considerations," *User Guide UG193*, v2.6, 114 pages, Oct. 2007.

Xilinx, Inc., "Implementing Barrel Shifters Using Multipliers", p. 1-4, Aug. 17, 2004.

Zhou, G. et al., "Efficient and High-Throughput Implementations of AES-GCM on FPGAs," *International Conference on Field-Programmable Technology*, 8 pgs., Dec. 2007.

\* cited by examiner

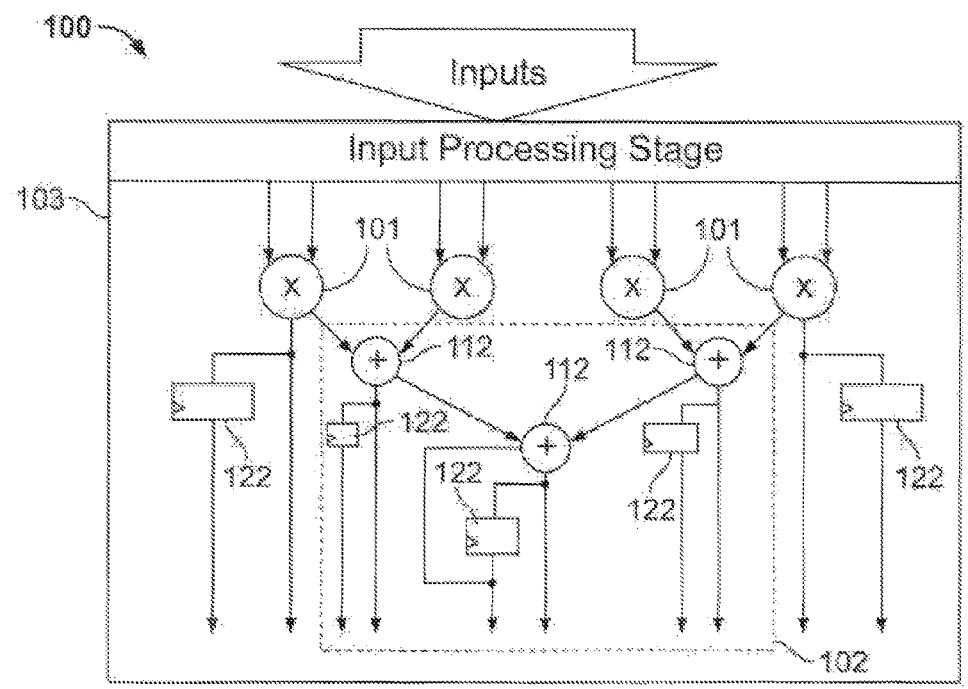
FIG. 1 "PRIOR ART"
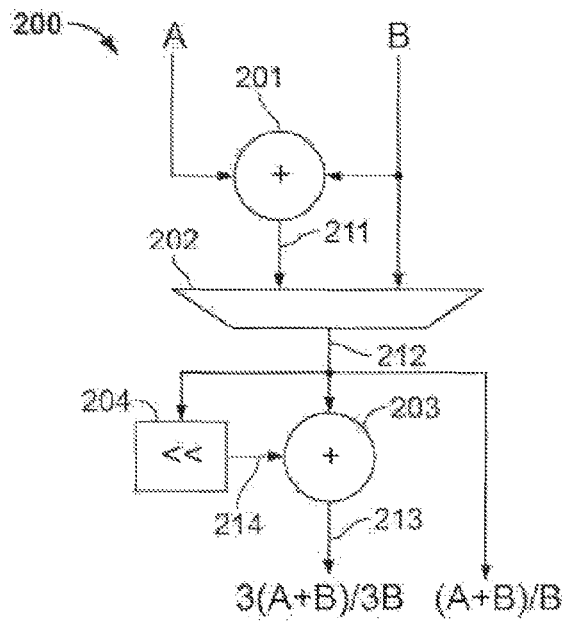
3(A+B)/3B  (A+B)/B
FIG. 2 "PRIOR ART"

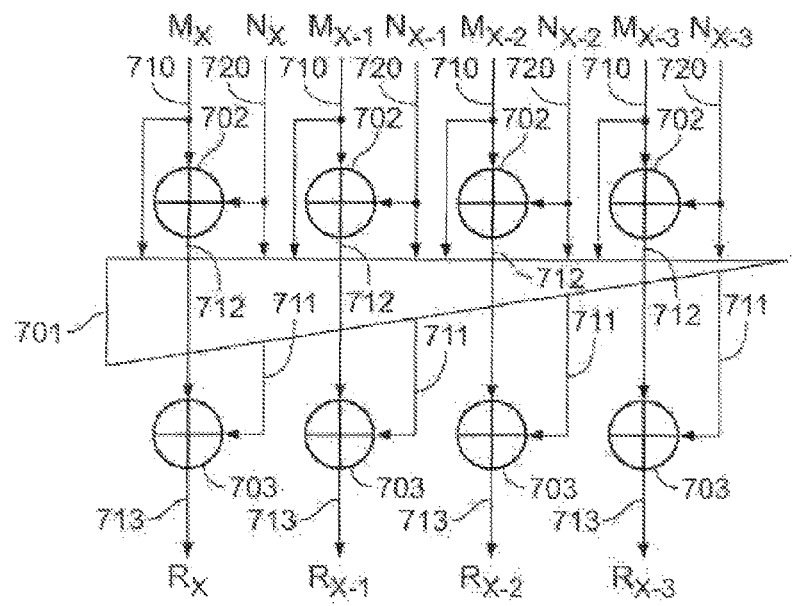
FIG. 7     "PRIOR ART"
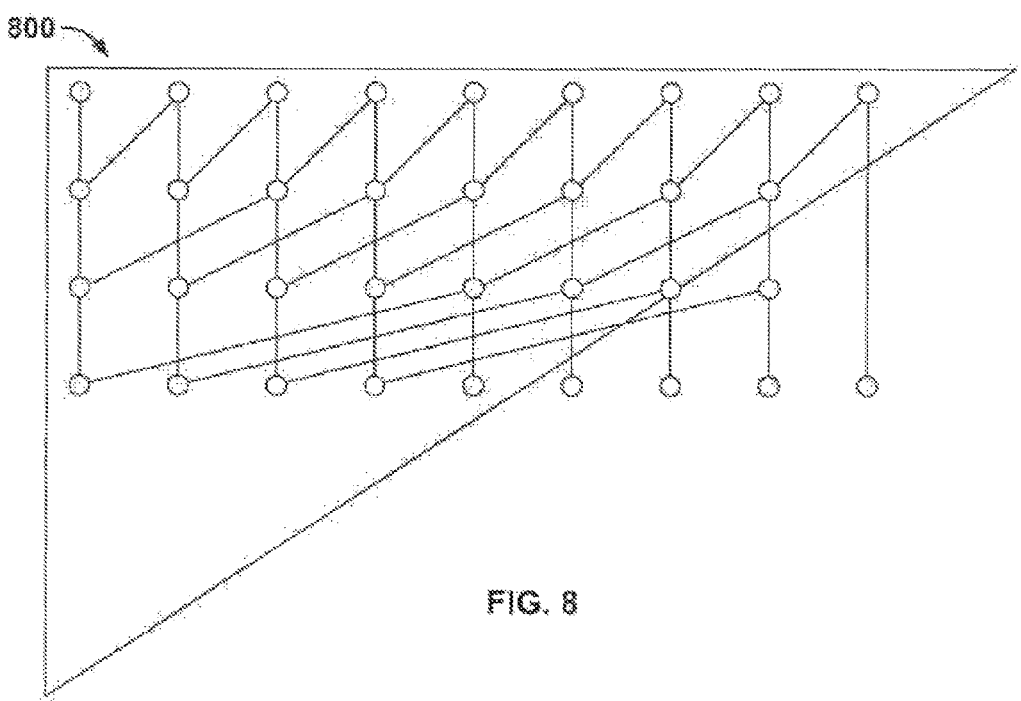
FIG. 8

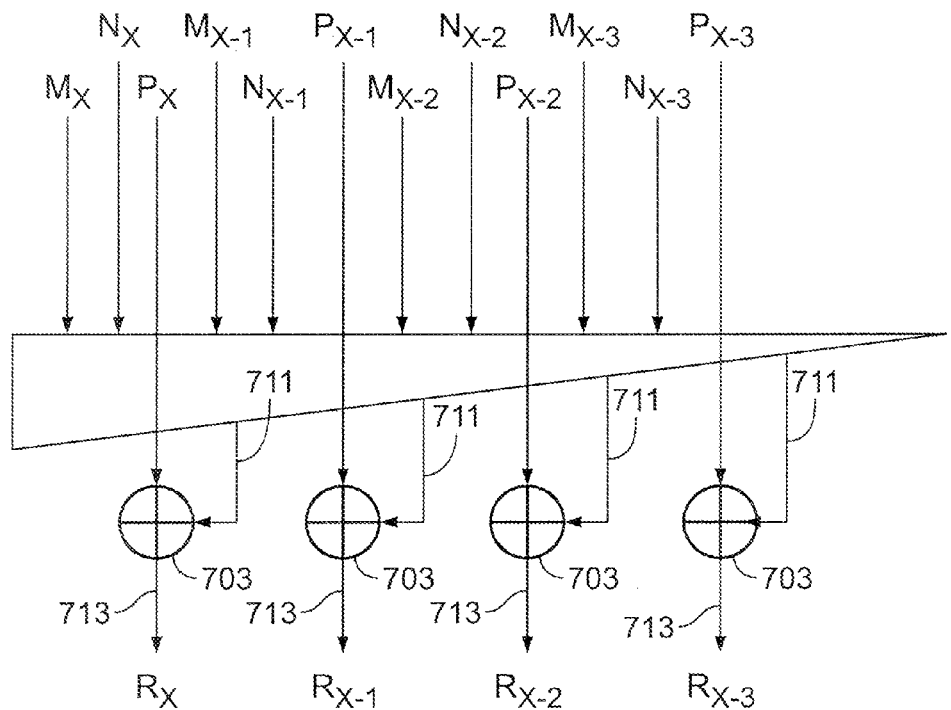
FIG. 9
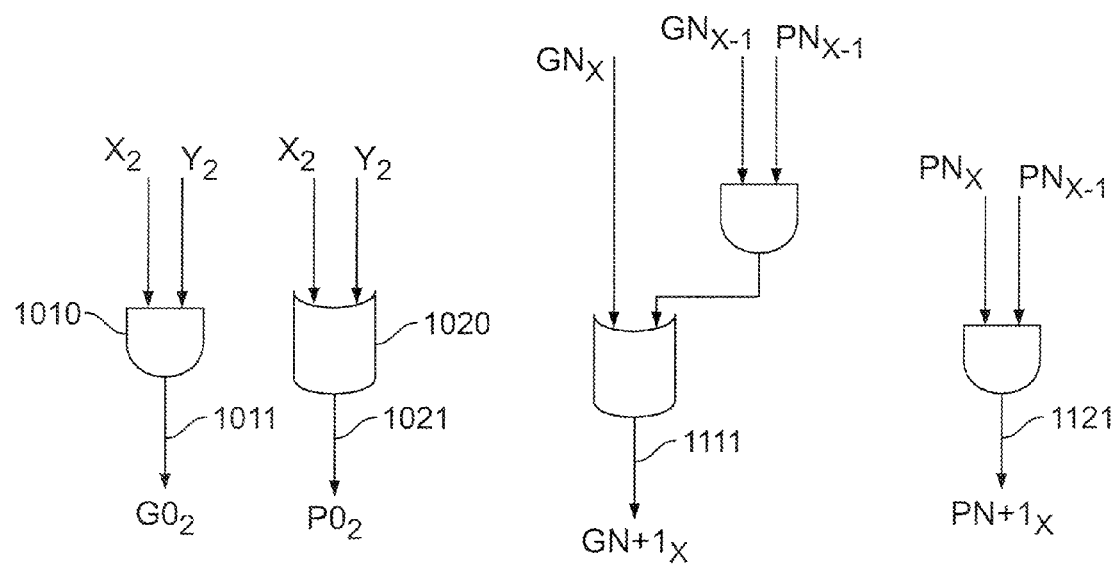
FIG. 10
FIG. 11

COMBINED ADDER AND PRE-ADDER FOR HIGH-RADIX MULTIPLIER CIRCUIT

FIELD OF THE INVENTION

This invention relates to circuitry that can be used to combine the initial adder of a high-radix multiplier with an optional pre-adder.

BACKGROUND OF THE INVENTION

Certain types of circuits that perform mathematical operations may require multiple adder circuits, such as carry-propagate or ripple-carry adders, which are inefficient. For example, in a symmetrical finite impulse response (FIR) filter, inputs may be added prior to being multiplied, which reduces the number of multipliers. However, that addition requires a pre-adder, and then the multiplication itself may include a compressor followed by another adder. The provision of multiple adders consumes a substantial amount of integrated circuit device area, and is of particular concern in programmable logic devices such as field-programmable gate arrays (FPGAs).

Moreover, large multiplication problems, such as those encountered in FIR filters, may require large compressor trees. The size of the compressor tree can be reduced by increasing the radix of the multiplier, but that in turn may require non-power-of-two manipulations of the inputs, which cannot be performed by simple shifting (as can be done for power-of-two manipulations), and may introduce the need for still more adders.

SUMMARY OF THE INVENTION

In accordance with embodiments of the present invention, the initial adder, or pre-adder, of an adder-multiplier-adder structure, which might itself include multiple adders (e.g., an adder-multiplexer-adder structure), can be simplified by providing a compressor followed by adders (e.g., a compressor-adder-adder structure). And because the adders will be adjacent one another, they can be combined into a single adder.

Therefore, in accordance with embodiments of the present invention there is provided circuitry accepting a first input value and a second input value and outputting (a) a first sum involving the first input value and the second input value, and (b) a second sum involving the first input value and the second input value. The circuitry includes a first adder circuit, a second adder circuit, a compressor circuit and a preprocessing stage. The first input value and the second input value are input to the first adder circuit to provide the first sum. The first input value and the second input value are input to the preprocessing stage to provide inputs to the compressor circuit. The compressor circuit provides first and second compressed output signals. The first and second compressed output signals are input to the second adder circuit to provide the second sum.

The preprocessing stage may include circuitry to programmably zero the first input value, so that the first sum is programmably settable to the second input value.

The compressor circuit may include respective separate circuitry for processing respective bit positions. For a respective bit position, the respective separate circuitry may have as inputs respective bits of each of the first and second input values, and respective next-less-significant bits of each of the first and second input values, and may further include an exclusive-OR gate combining the respective bits of each of the first and second input values. Output of the exclusive-OR gate in the respective separate circuitry for that respective bit position may be shared with respective separate circuitry for a next-more-significant bit position.

In the respective separate circuitry for the respective bit position, the respective next-less-significant bits of each of the first and second input values may be borrowed from respective separate circuitry for a next-less-significant bit position.

The first adder circuit may include a prefix tree having as inputs respective bits of the first and second input values, and providing as outputs respective carry values for each bit position. The first adder circuit also may include respective exclusive-OR gates for each bit position, each respective exclusive-OR gate having as inputs the respective carry value for that respective bit position, and the output of the exclusive-OR gate in that respective separate circuitry for that respective bit position.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIG. 1 shows a simplified representation of a digital signal processing (DSP) block;

FIG. 2 shows an example of input processing circuitry that may be provided in an input stage of a DSP block to provide an input and that input multiplied by '3';

FIG. 7 shows an example of the internal structure of a carry-propagate adder;

FIG. 8 shows a portion of a Kogge-Stone prefix tree;

FIG. 9 shows the internal structure of an embodiment of a carry-propagate adder according to the present invention;

FIG. 10 shows an example of how the generate output and the propagate output may be determined at each node in the first level of a Kogge-Stone prefix tree;

FIG. 11 shows an example of how the generate output and the propagate output may be determined at each node in each level beyond the first level of a Kogge-Stone prefix tree;

DETAILED DESCRIPTION OF THE INVENTION

Figure 3:
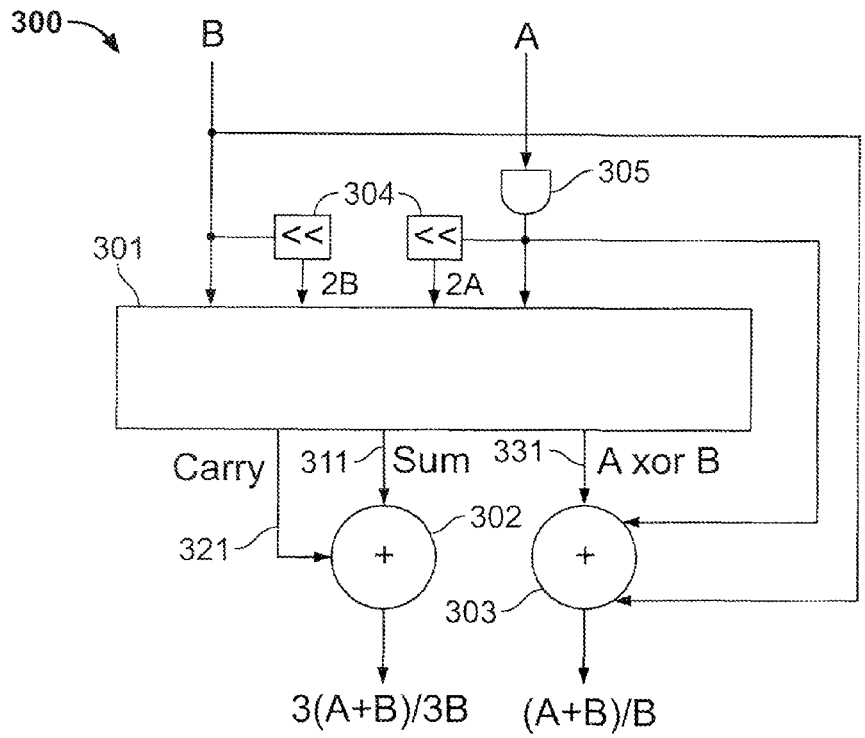
FIG. 3 shows input processing circuitry according to an embodiment of the present invention.

The discussion that follows will be based on an example of a programmable integrated circuit device such as an FPGA. However, it should be noted that the subject matter disclosed herein may be used in any kind of fixed or programmable device.

FIG. 1 shows a simplified representation of a digital signal processing (DSP) block 100 of the type that may be found in many types of integrated circuit devices, including, e.g., a programmable device such as an FPGA. DSP block 100 may include a plurality of multipliers 101 followed by adder/accumulator circuitry 102 that may include multiple adders 112 and registers 122, as well as the ability to route out individual multiplication results without further combination. In addition, an input stage 103 may include various kinds of circuits for pre-multiplication manipulation of input signals, such as registers, shifters, multiplexers and adders (not shown).

As discussed above, it may be desirable to increase the radix of multipliers 101. A radix-4 multiplier with inputs X and Y would also need inputs 2X and 2Y. Such inputs could easily be provided by left-shifting of X and Y by one bit position. However, a radix-8 multiplier, which is commonly used in higher-radix operations, would require 3X and 3Y, which cannot be provided by shifting.

FIG. 2 shows an example of input processing circuitry 200 that may be provided in input stage 103 to provide both an input, and that input multiplied by '3', without using a further multiplier. This example further includes pre-addition of two inputs, as may be used in the symmetrical filter implementation discussed above. Thus, the inputs A and B shown in FIG. 2 should not be considered the equivalent of inputs X and Y discussed above. Rather, the outputs of FIG. 2 correspond to either input X or input Y; that is, both input X and input Y could have been processed by such circuitry.

Adder 201 adds inputs A and B. Multiplexer 202 selects as its input either that sum 211 (A+B), or input B. Output 212 of input processing circuitry 200 therefore is either (A+B) or B, depending on the selection made by multiplexer 202. Output 212 also is routed both to adder 203 and to shifter 204. Shifter 204 shifts output 212 one bit to the left, effectively multiplying output 212 by '2'. Shifter output 214 is added to output 212 by adder 203. Output 213 is therefore either 3(A+B) or 3B, depending on the selection made by multiplexer 202.

While input processing circuitry 200 achieves the desired result of providing the product of '3' and another input, where the input may be a single number, or two added numbers (as in the symmetrical filter example), its adder-multiplexer-adder structure is inefficient, consuming significant device area.

Improved input processing circuitry 300 according to an embodiment of the invention is shown in FIG. 3, and includes a compressor 301 followed by two adders 302, 303 which may be, e.g., carry-propagate adders. Input processing circuitry 300 also has a preprocessing stage including shifters 304 to provide inputs 2A and 2B from inputs A and B, as well as an AND-gate 305 to provide the selection function of multiplexer 202. AND gate 305 has a second input (not shown) which enables it to be used as a switch by inputting either a '0' or a '1' to that second input.

If AND-gate 305 is turned ON (by inputting '1' to its second input), compressor 301 compresses inputs 2A, A, 2B and B to provide redundant-form sum and carry vectors 311, 321 representing 3(A+B), which are added by carry-propagate adder 302 to provide the output 3(A+B). If AND-gate 305 is turned OFF (by inputting '0' to its second input, thereby programmably zeroing the 'A' input), adder 302 provides the output 3B.

At the same time, if AND-gate 305 is turned ON, adder 303 provides the output A+B, while if AND-gate 305 is turned OFF, adder 303 provides the output B. Although adder 303 may be a standard carry-propagate adder as noted above, it may be modified, as discussed in more detail below. Such modifications may require the input of A XOR B, which optionally may be provided at 331 by compressor 301, in a manner described below.

The structure shown in FIG. 3 replaces the adder-multiplexer-adder structure of FIG. 2 with a more efficient compressor-and-parallel-adders structure. In accordance with further implementations of embodiments of the invention, the circuitry may be made even more efficient.

Figure 4:
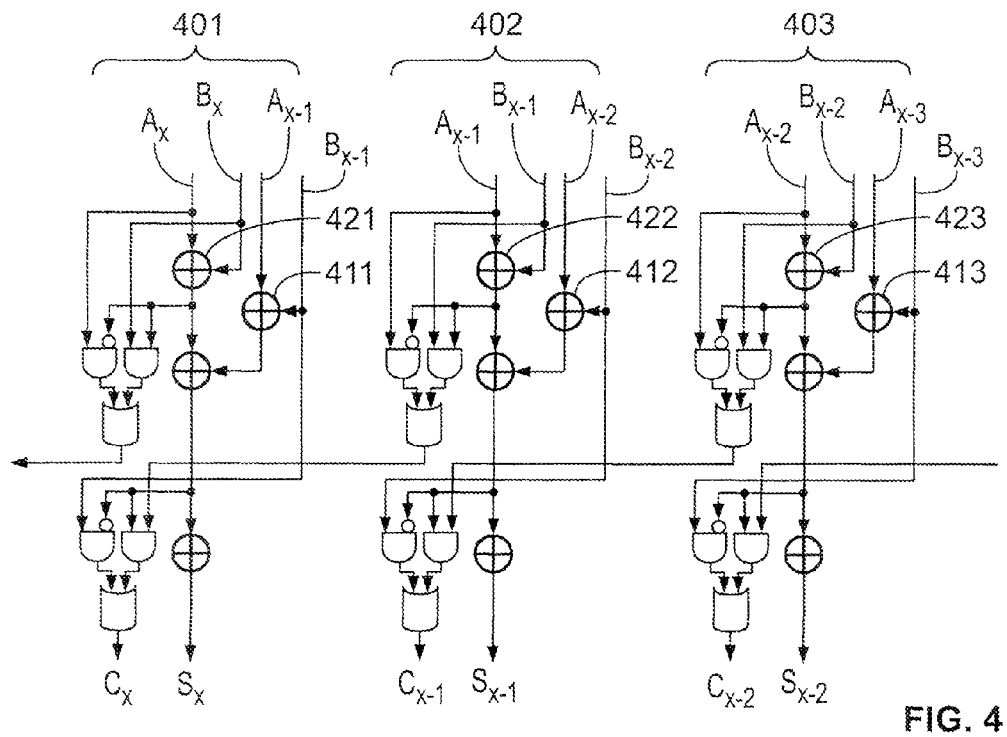
FIG. 4 shows an example of the internal structure of a portion of a compressor circuit.
Figure 5:
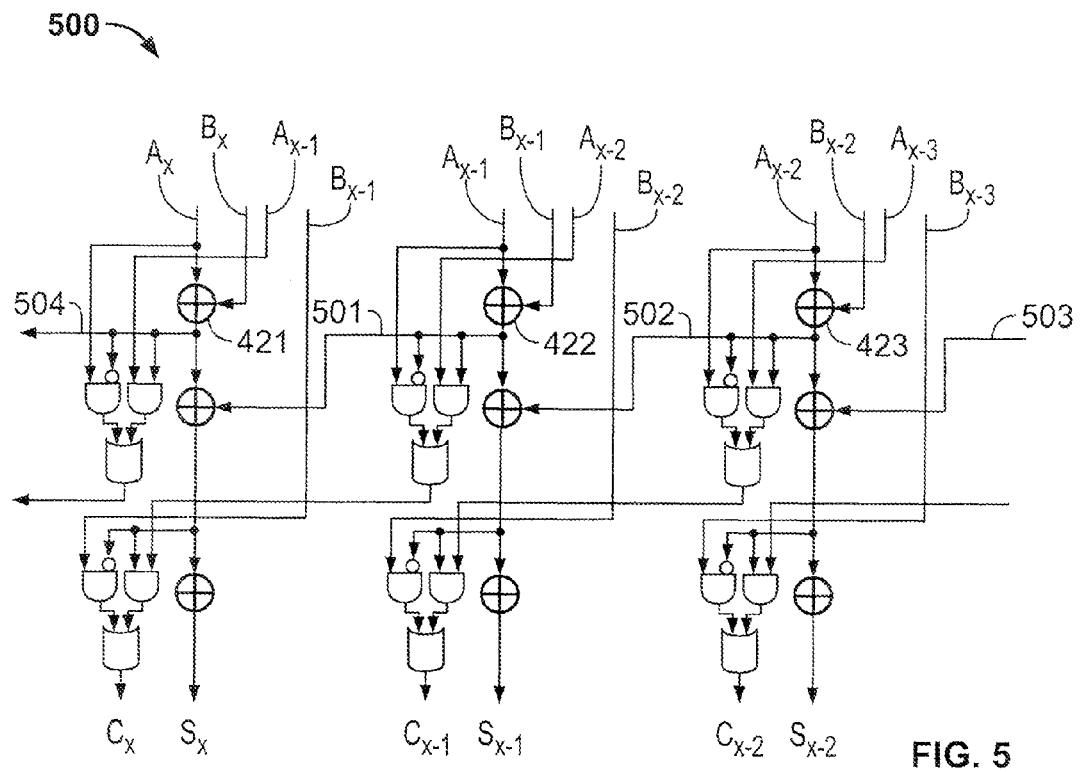
FIG. 5 shows the internal structure of a portion of a first embodiment of a compressor circuit according to the present invention.

FIG. 4 shows an example of the internal structure of three bits 401, 402, 403 of a 4-2 compressor for adding four inputs, as in FIG. 3, according to a known compressor architecture. While the compressor architecture shown in FIG. 3 is relatively efficient, efficiency can be improved for the particular operation at issue here, because the relationship of the inputs is such that adjacent bit positions share certain inputs. For example, XOR-gates 411 and 422 have the same inputs. Therefore, in the structure 500 shown in FIG. 5, XOR-gate 411 can be eliminated in favor of connection 501. Similarly, XOR-gates 412 and 423 have the same inputs, meaning that in structure 500, XOR-gate 412 can be eliminated in favor of connection 502. And XOR-gate 413 shares inputs with an unseen XOR-gate in the next bit to the right (in the orientation of the drawing), so that XOR-gate 413 can be eliminated in favor of connection 503. In the same way, connection 504 can eliminate an unseen XOR-gate in the next bit to the left.

Figure 6:
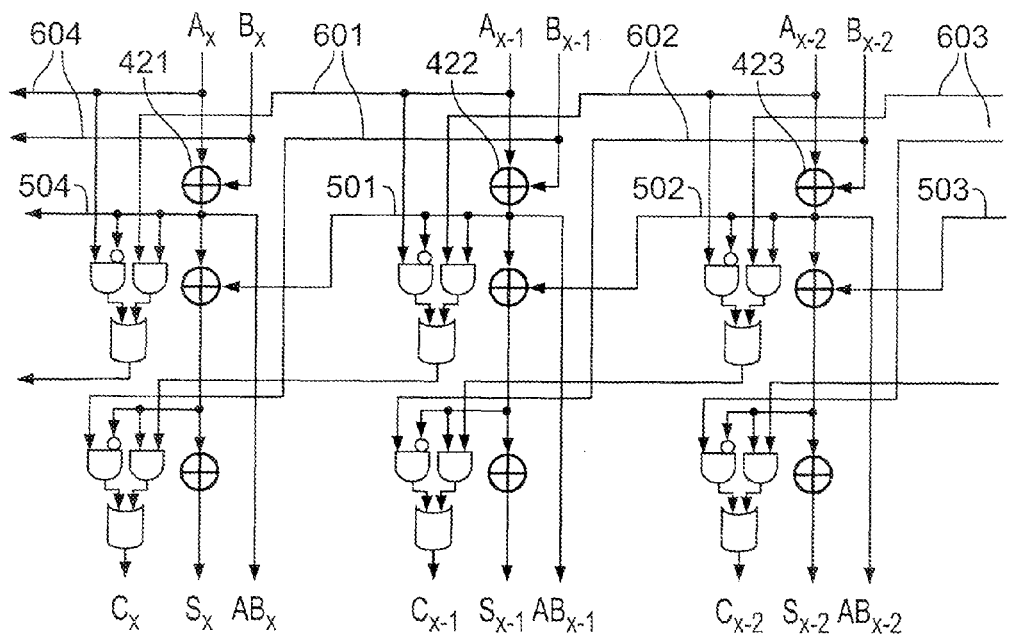
FIG. 6 shows the internal structure of a portion of a second embodiment of a compressor circuit according to the present invention.

In a further optimization shown in FIG. 6, the common inputs referred to in the previous paragraph may be replaced by connections 601, 602, 603, 604. Specifically, instead of inputting $A_{x-1}$ and $B_{x-1}$ to both bits 401, 402, $A_{x-1}$ and $B_{x-1}$ can be input to bit 402, and conducted to bit 401 by conductors 601. Similarly, instead of inputting $A_{x-2}$ and $B_{x-2}$ to both bits 402, 403, $A_{x-2}$ and $B_{x-2}$ can be input to bit 403, and conducted to bit 402 by conductors 602. Likewise, conductors 603 can bring the unseen $A_{x-3}$ and $B_{x-3}$ inputs to bit 403 from the unseen bit to the right of bit 403, and conductors 604 can bring the $A_x$ and $B_x$ inputs from bit 401 to the unseen bit to the left of bit 401.

As described above, FIG. 3 includes two carry-propagate adders 302, 303, one of which (carry-propagate adder 302) adds the sum and carry vectors representing 3(A+B) (or 3B), and one of which (carry-propagate adder 303) adds A and B. A conventional carry-propagate adder with inputs X and Y might have the structure 700 shown in FIG. 7, in which the various bits of M (710) and N (720) are input to prefix tree 701 (a Kogge-Stone prefix tree 800 is shown in FIG. 8, although many other prefix tree architectures may be suitable and may be used; the choice of prefix tree architecture may depend on the particular design) to provide carry outputs 711. The bits of M (710) and N (720) also are XORed together by XOR-gates 702, and that XOR result 712 is further XORed by XOR-gates 703 with the carry outputs 711. In the case of a carry-propagate adder following a compressor as in FIG. 3, the various M and N inputs would be the bits of the sum and carry outputs S and C, respectively.

In accordance with another embodiment of this invention, carry-propagate adder 303 can be simplified by eliminating XOR-gates 702, because the XOR results 712 for the A+B calculation are already available in compressor 301 at XOR-gates 421, 422, 423. Carry-propagate adder 303 would therefore have the structure shown in FIG. 9, in which the various M and N inputs would be the bits of A and B (cf., $A_x$, $B_x$, $A_{x-1}$, $B_{x-1}$, $A_{x-2}$, $B_{x-2}$, etc. in FIG. 6), respectively, and the various P inputs would be the bits of A XOR B (cf., $AB_x$, $AB_{x-1}$, $AB_{x-2}$, etc. in FIG. 6).

Another embodiment of this invention relies on the fact that the inputs to carry-propagate adder 203 have a known relationship to each other—viz., that a second input is twice a first input or, in other words, the second input is the first input shifted left one bit. Thus each bit position of the second input can be represented by the next leftmost bit position of the first input, or each bit position of the first input can be represented by the next rightmost bit position of the second input. According to this embodiment, carry-propagate adder 203 can be simplified by altering its prefix tree as discussed below.

Referring again to Kogge-Stone prefix tree 800 shown in FIG. 8, each dot in FIG. 8 represents a generate node and propagate node. Typically, the propagate nodes are not output, while the generate nodes provide carry outputs 711 that are input to XOR-gates 703, as shown in FIG. 7. FIG. 10 shows examples of structures used in the first row of prefix tree 800. The two input bits at each bit position in that first row are used to create a generate output 1011 and a propagate output 1021. As shown in FIG. 10, generate output 1011 may be created by ANDing of the two inputs at 1010, and propagate output 1021 may be created by ORing of the two inputs at 1020. FIG. 10 is drawn showing the example of bit position 2 with inputs $X_2$, $Y_2$, but is the same for any bit position n (with inputs $X_n$, $Y_n$).

Each subsequent node in prefix tree 800 may include structures as shown in FIG. 11 to calculate its generate output 1111 and its propagate output 1121 using the logic structures of FIG. 11. (In FIGS. 10 and 11, the index—(0, N, N+1)—refers to the level of prefix tree 800—i.e., the row in FIG. 8, where the top row has index 0—and the subscript refers to the bit position—i.e., the column in FIG. 8, where the rightmost row is bit position 0. As previously noted above, FIG. 10 represents any bit position n, with n=2 being shown. Similarly, FIG. 11 represents any bit position x, which is not the same as input X of FIG. 10.)

In the case where X+Y=A+2A, these structures can be simplified. To avoid confusion, let A=C, so that A+2A=C+(C<<1) (where "<<" denotes a left-shift operation, which for binary numbers is equivalent to multiplying by two). In such an addition, the bits of the two inputs would line up as follows:

$$C_5 C_4 C_3 C_2$$

$$C_5 C_4 C_3 C_2$$

It should be noted that in this example, while only four bits of each input are shown (from $C_5$ down to $C_2$), bits down to the 0th bit extend to the right and bits up to the highest bit required extend to the left. From here, it can be seen that any pair of the $X_n$, $Y_n$ inputs in FIG. 10 becomes $C_n$, $C_{n-1}$.

Figure 12:
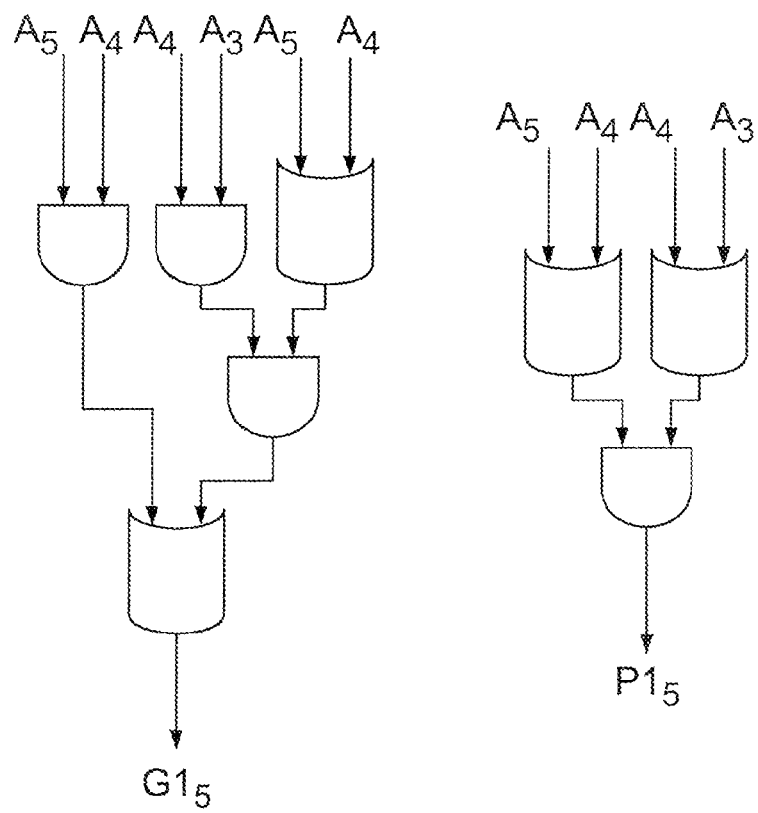
FIG. 12 shows how the generate and propagate structures of FIGS. 10 and 11 may be combined in a particular case according to an embodiment of the present invention.
Figure 13:
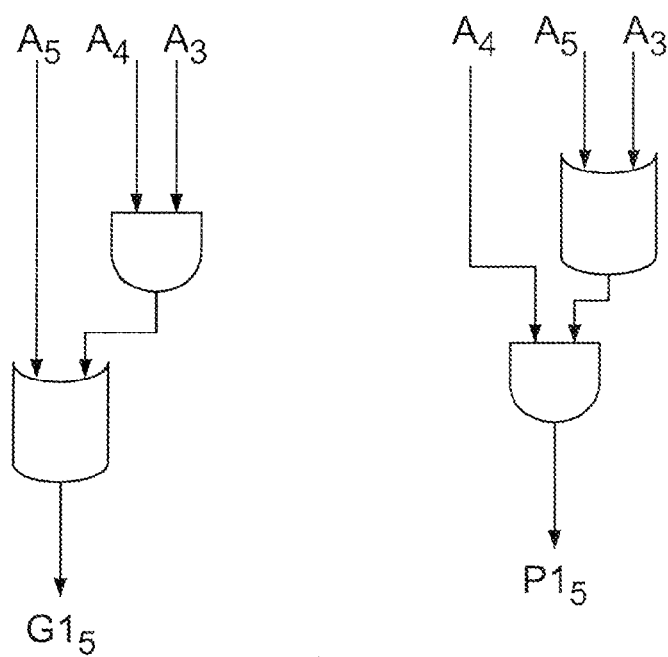
FIG. 13 shows how the generate and propagate structures of FIG. 12 may be simplified according to an embodiment of the present invention.

Taking then as an example bit position n=5, and inputting $A_5$ and $A_4$ (A=C as noted above) to the structures shown in FIG. 10 for row 0 of prefix tree 800, and then substituting those structures into the structures shown in FIG. 11 for row 1 of prefix tree 800, yields the logic structures shown in FIG. 12 for bit position n=5 for the combination of row 0 and row 1. Simplifying the logic structures of FIG. 12 yields the logic structures of FIG. 13. Thus, for the case where the two inputs of an adder are a number and twice that number, then the initial rows of the prefix tree can be substantially reduced, in terms of device area, to the structures of FIG. 13.

As can be seen from FIG. 8, a Kogge-Stone prefix tree has many more nodes in its early rows than in its later rows. It will be appreciated, then, that where an adder is built using a Kogge-Stone prefix tree, or any prefix tree with a similar architecture, the simplification of the initial rows according to the embodiment implemented in FIGS. 10-13 can reduce the overall device area consumed by the prefix tree by between about 15% and about 25%, depending on the particular prefix tree architecture used.

Thus it is seen that for implementing certain kinds of arithmetic operations, such as a choice between addition, and pre-addition for a multiplier, adder circuitry can be provided having reduced area, based on logical simplification or sharing of logic.

Figure 14:
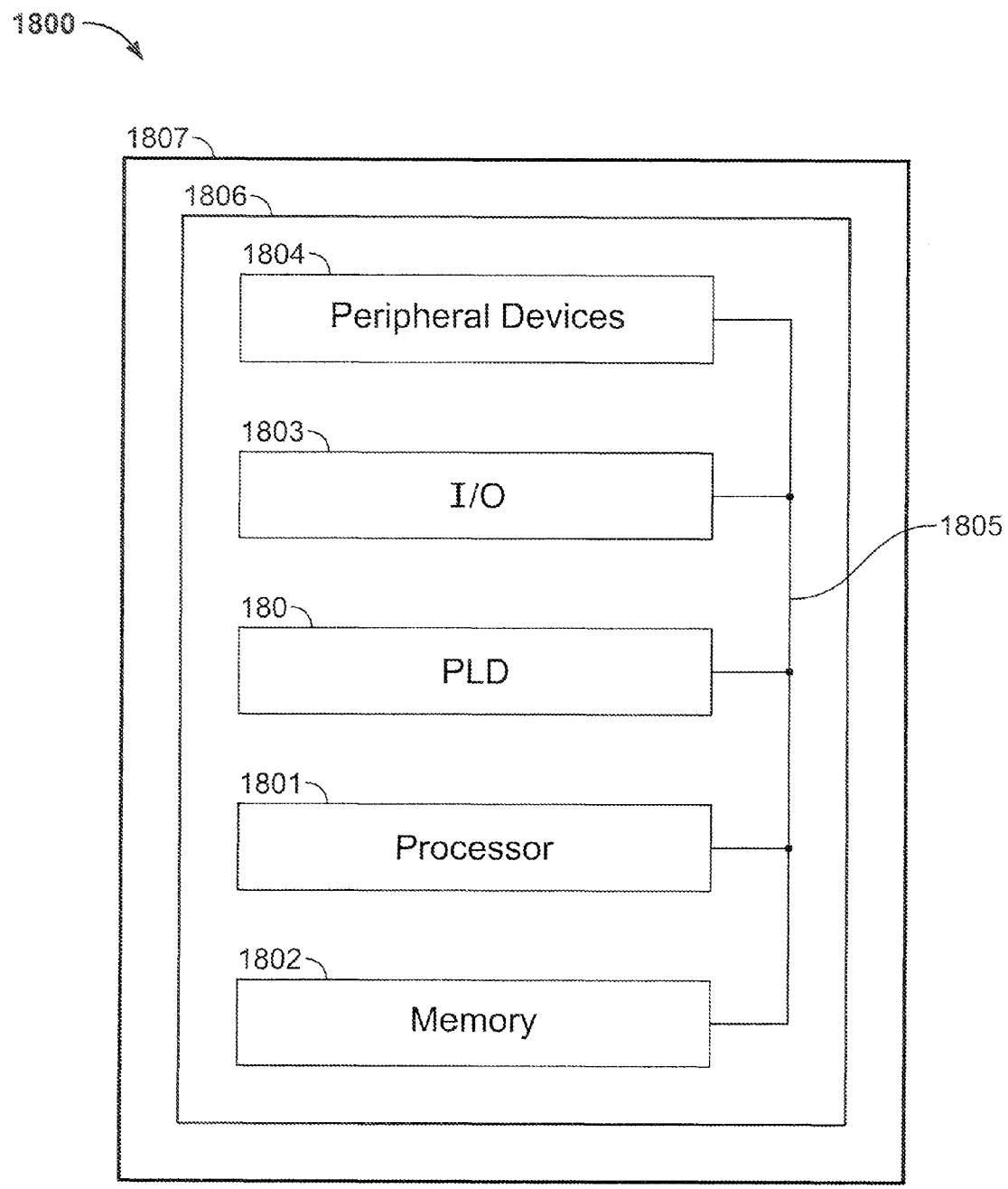
FIG. 14 is a simplified block diagram of an exemplary system employing a programmable logic device incorporating the present invention.

A PLD 180 configured to include arithmetic circuitry according to any implementation of the present invention may be used in many kinds of electronic devices. One possible use is in an exemplary data processing system 1800 shown in FIG. 14. Data processing system 1800 may include one or more of the following components: a processor 1801; memory 1102; I/O circuitry 1803; and peripheral devices 1804. These components are coupled together by a system bus 1805 and are populated on a circuit board 1806 which is contained in an end-user system 1807.

System 1800 can be used in a wide variety of applications, such as computer networking, data networking, instrumentation, video processing, digital signal processing, Remote Radio Head (RRH), or any other application where the advantage of using programmable or reprogrammable logic is desirable. PLD 180 can be used to perform a variety of different logic functions. For example, PLD 180 can be configured as a processor or controller that works in cooperation with processor 1801. PLD 180 may also be used as an arbiter for arbitrating access to a shared resources in system 1800. In yet another example, PLD 180 can be configured as an interface between processor 1801 and one of the other components in system 1800. It should be noted that system 1800 is only exemplary, and that the true scope and spirit of the invention should be indicated by the following claims.

Various technologies can be used to implement PLDs 180 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Circuitry accepting a first input value and a second input value and outputting (a) a first sum involving said first input value and said second input value, and (b) a second sum involving said first input value and said second input value, said circuitry comprising:
    a first adder circuit;
    a second adder circuit;
    a compressor circuit; and
    a preprocessing stage; wherein:
    said first input value and said second input value are input to said first adder circuit to provide said first sum;

said first input value and said second input value are input to said preprocessing stage to provide inputs to said compressor circuit, said compressor circuit providing first and second compressed output signals;

said first and second compressed output signals are input to said second adder circuit to provide said second sum.

2. The circuitry of claim 1 wherein said first adder circuit and said second adder circuit are carry-propagate adders.

3. The circuitry of claim 1 wherein:
said preprocessing stage comprises circuitry to programmably zero said first input value; whereby:
said first sum is programmably settable to said second input value.

4. The circuitry of claim 3 wherein said circuitry to programmably zero said first input value comprises an AND gate having as inputs said first input value and ground.

5. The circuitry of claim 1 wherein:
said preprocessing stage comprises circuitry to double each of said first input value and said second input value for input to said compressor circuit along with said first input value and said second input value; whereby:
said second sum is three times said first sum.

6. The circuitry of claim 1 wherein:
said compressor circuit comprises respective separate circuitry for processing respective bit positions;
for a respective bit position, said respective separate circuitry has as inputs respective bits of each of said first and second input values, and respective next-less-significant bits of each of said first and second input values, and further includes an exclusive OR gate combining said respective bits of each of said first and second input values; and
output of said exclusive OR gate in said respective separate circuitry for said respective bit position is shared with respective separate circuitry for a next-more-significant bit position.

7. The circuitry of claim 6 wherein in said respective separate circuitry for said respective bit position, said respective next-less-significant bits of each of said first and second input values are borrowed from respective separate circuitry for a next-less-significant bit position.

8. The circuitry of claim 6 wherein said first adder circuit comprises:
a prefix tree having as inputs respective bits of said first and second input values, and providing as outputs respective carry values for each bit position; and
respective exclusive OR gates for each bit position, each respective exclusive OR gate having as inputs said respective carry value for said respective bit position, and said output of said exclusive OR gate in said respective separate circuitry for said respective bit position.

9. The circuitry of claim 8 wherein said prefix tree is a Kogge-Stone prefix tree.

10. Adder circuitry for two input values, wherein one of said two input values being twice another of said two input values, said adder circuitry comprising:
respective input exclusive OR gates for each bit position, each respective input exclusive OR gate having as inputs respective bits of said two input values;
a prefix tree having as inputs respective bits of said two input values, and providing as outputs respective carry values for each bit position; and
respective output exclusive OR gates for each bit position, each respective output exclusive OR gate having as inputs said respective carry value for said respective bit position, and said output of said respective input exclusive OR gate; wherein:
said prefix tree is customized by constructing an initial level of said prefix tree based on each respective bit of said one of said two input values being identical to a respective next-less-significant bit of said another of said two input values.

11. The adder circuitry of claim 10 wherein said constructing of said initial level comprises collapsing first and second levels of said prefix tree based on simplifying the logic structures of the first and second levels.

12. The adder circuitry of claim 10 wherein said prefix tree is based on a Kogge-Stone prefix tree.

13. Circuitry accepting a first input value at a first input port and a second input value at a second input port and outputting (a) a first sum involving said first input value and said second input value, and (b) a second sum involving said first input value and said second input value, said circuitry comprising:
a first adder circuit;
a second adder circuit;
a compressor circuit coupled to said second adder circuit; and
a preprocessing stage coupled between said first and second input ports, said compressor circuit, and said first adder circuit, wherein said preprocessing stage comprises circuitry to programmably zero said first input value; whereby:
said first sum is programmably settable to said second input value and said second sum is programmable to be independent of said first input value.

14. The circuitry of claim 13 wherein said circuitry to zero said first input value comprises an AND gate having as inputs said first input value and ground.

15. The circuitry of claim 13 wherein:
said first input value and said second input value are input to said first adder circuit to provide said first sum;
said first input value and said second input value are input to said preprocessing stage to provide inputs to said compressor circuit, said compressor circuit providing first and second compressed output signals;
said first and second compressed output signals are input to said second adder circuit to provide said second sum.

16. The circuitry of claim 13 wherein said first adder circuit and said second adder circuit are carry-propagate adders.

17. The circuitry of claim 13 wherein:
said preprocessing stage comprises circuitry to double each of said first input value and said second input value for input to said compressor circuit along with said first input value and said second input value; whereby:
said second sum is three times said first sum.

18. The circuitry of claim 13 wherein:
said compressor circuit comprises respective separate circuitry for processing respective bit positions;
for a respective bit position, said respective separate circuitry has as inputs respective bits of each of said first and second input values, and respective next-less-significant bits of each of said first and second input values, and further includes an exclusive OR gate combining said respective bits of each of said first and second input values; and
output of said exclusive OR gate in said respective separate circuitry for said respective bit position is shared with respective separate circuitry for a next-more-significant bit position.

19. The circuitry of claim 18 wherein in said respective separate circuitry for said respective bit position, said respective next-less-significant bits of each of said first and second input values are borrowed from respective separate circuitry for a next-less-significant bit position.

20. The circuitry of claim 18 wherein said first adder circuit comprises:
   a prefix tree having as inputs respective bits of said first and second input values, and providing as outputs respective carry values for each bit position; and
   respective exclusive OR gates for each bit position, each respective exclusive OR gate having as inputs said respective carry value for said respective bit position, and said output of said exclusive OR gate in said respective separate circuitry for said respective bit position.

21. The circuitry of claim 20 wherein said prefix tree is a Kogge-Stone prefix tree.

* * * * *